Figure 1:
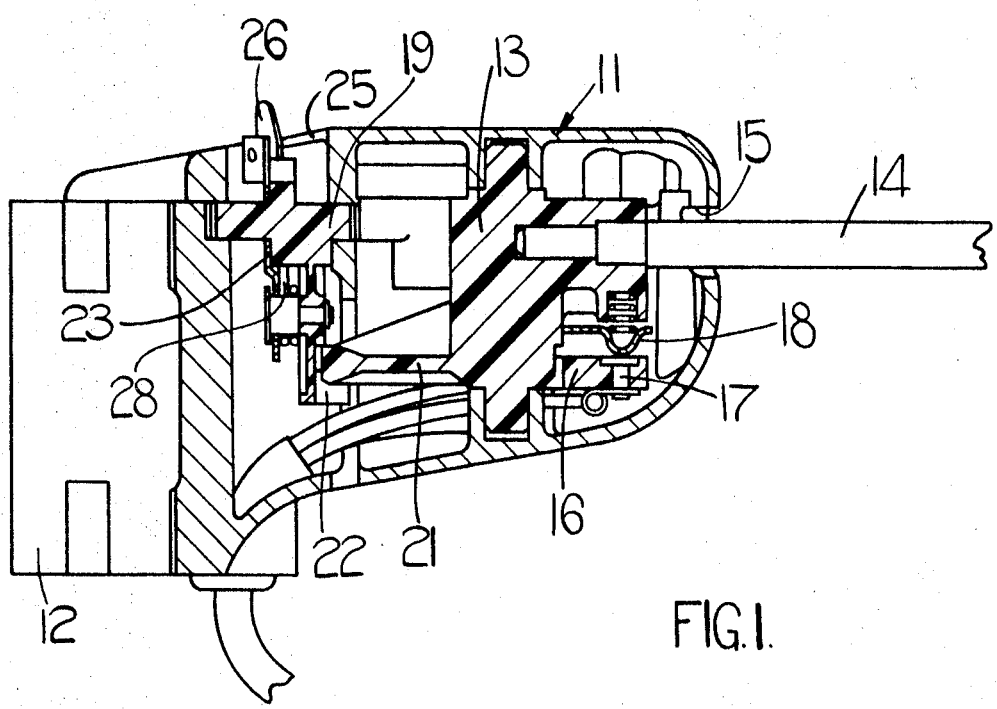

United States Patent

[11] 3,586,800

[72] Inventor Alec John Heap
 Burnley, England
[21] Appl. No. 302
[22] Filed Jan. 2, 1970
[45] Patented June 22, 1971
[73] Assignee Joseph Lucas (Industries) Limited
 Birmingham, England
[32] Priority Jan. 13, 1969
[33] Great Britain
[31] 1877/69

[54] DIRECTION INDICATOR SWITCHES
 1 Claim, 3 Drawing Figs.
[52] U.S. Cl. ........................................... 200/61.34,
 340/73
[51] Int. Cl. ........................................... H01h 3/16
[50] Field of Search............................. 200/61.27-
 —61.38, 61.54; 340/73

[56] References Cited
 UNITED STATES PATENTS
2,542,242 2/1951 Fuller............................. 200/61.34

Primary Examiner—Robert K. Schaefer
Assistant Examiner—M. Ginsburg
Attorney—Holman & Stern ABSTRACT: A direction indicator switch for a road vehicle includes a body which is adapted to be secured to the stationary, outer part of the steering column of a road vehicle, adjacent the steering wheel. A manually movable rotor is pivotally mounted on the body for movement relative to the body about an axis parallel to but spaced from the axis of rotation of the steering column, and the rotor assembly is movable between a pair of operative positions which are spaced on opposite sides of a central off position. The switch further includes contacts which are operable in the operative positions of the rotor to energize indicator lamps on opposite sides of the road vehicle respectively. A cancelling pawl assembly is operable by a striker mounted on the steering wheel, and the cancelling pawl assembly is pivotable relative to the body about an axis at right angles to the axis about which the rotor is movable. The cancelling pawl assembly has a pair of operative positions on opposite sides of a central inoperative position, and there is provided a finger on the rotor which engages between a pair of walls on the cancelling pawl assembly to couple the cancelling pawl assembly and the rotor so that movement of the rotor is transmitted to cause movement of the cancelling pawl assembly, and similarly movement of the cancelling pawl assembly is transmitted to cause movement of the rotor.

DIRECTION INDICATOR SWITCHES

This invention relates to direction indicator switches for road vehicles.

A switch according to the invention includes a body adapted to be secured to the stationary outer part of the steering column of a road vehicle, a manually movable rotor pivotally mounted on the body for movement relative to the body about an axis parallel to the axis of the steering column between a pair of operative positions on opposite sides of a central off position, contacts operable in the operative positions of the rotor to energize indicator lamps on opposite sides of the vehicle respectively, a cancelling pawl assembly operable by a striker rotatable with the steering wheel of the vehicle in a plane parallel to but spaced from the plane of rotation of the rotor the cancelling pawl assembly being pivotally mounted on the body for movement relative to the body about an axis at right angles to the axis about which the rotor is movable, between a pair of operative positions on opposite sides of a central inoperative position, and means for interconnecting the cancelling pawl assembly and the rotor so that movement of the rotor to an operative position moves said assembly to an operative position and return movement of said assembly to its inoperative position returns said rotor to its off position.

Figure 2:
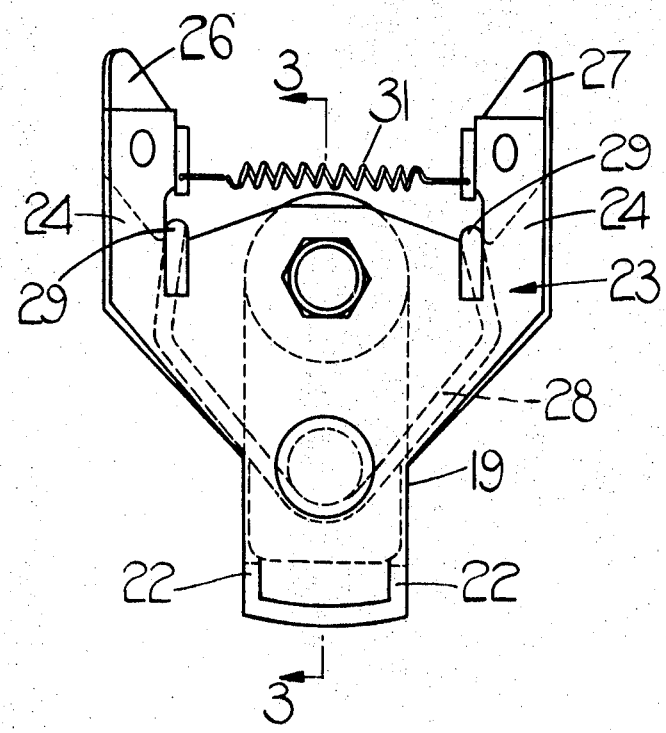
Figure 3:
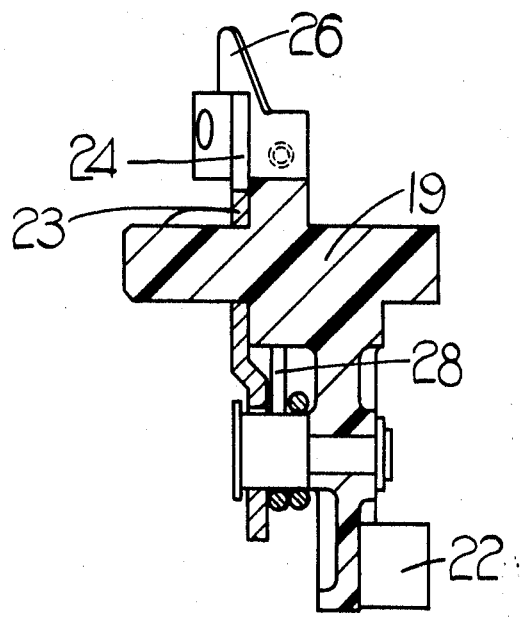

One example of the invention is illustrated in the accompanying drawings, wherein FIG. 1 is a sectional view of a direction indicator switch according to one example of the invention, FIG. 2 is a front elevational view of the pivot piece of the switch shown in FIG. 1, and FIG. 3 is a sectional view on the line 3–3 in FIG. 2.

Referring to the drawings, the direction indicator switch includes a casing 11 which is formed in upper and lower mating parts, and which is adapted at 12 to be secured to the outer, fixed part of the steering column of a road vehicle. Journaled for rotation in the casing 11 about an axis parallel with the axis of the steering column of the road vehicle is a moulded synthetic resin rotor 13, having extending radially outwardly therefrom an operating lever 14. The lever 14 extends through an elongated slot 15 in the wall of the casing and the lever 14 is movable in a plane at right angles to the axis of the steering column to pivot the rotor 13 relative to the casing 11. Supported within the casing 11 adjacent the rotor 13 is a fixed contact board 16 carrying three equiangularly spaced contacts one of which is shown at 17. The rotor 13 carries a movable conductive bridging piece 18 which is engageable with the fixed contacts carried by the board 16. Detent means (not shown) is provided for maintaining the rotor 13 in any one of three angularly spaced positions relative to the casing 11. The center of the three positions is an inoperative position wherein the bridging piece 18 does not complete any circuits between the contacts carried by the board 16. The two positions on either side of the central positions are operative positions wherein the bridging piece 18 and the fixed contacts carried by the board 16 cooperate to complete circuits to the direction indicator lamps on opposite sides of the vehicle respectively.

A moulded synthetic resin pivot piece 19 is pivotally mounted in the casing 11 for movement about an axis at right angles to the pivotal axis of the rotor 13, and the positioning of the components of the switch is such that the axis of rotation of the steering column, the axis of rotation of the rotor 13, and the axis of rotation of the pivot piece 19 all lie in the same plane. The rotor 13 includes an integral finger 21 which extends towards the steering column, and which is engaged at its free end, between a pair of walls 22 on the pivot piece 19 below the pivotal axis thereof. The engagement of the finger 21 between the walls 22 of the pivot piece 19 interconnects the pivot piece 19 and the rotor 13 in such a manner that movement of the rotor 13 relative to the casing is transmitted to the pivot piece 19 to move the pivot piece 19 about its pivotal axis relative to the casing.

Rigidly secured to the pivot piece 19 is bifurcated metal plate 23 the limbs 24 of which extend towards an aperture 25 in the upper wall of the casing 11. The limbs 24 carry respective pawl members 26,27 which are pivotally mounted on their respective limbs 24, and which project from the upper wall of the casing 11 through the aperture 25. The pivot piece 19 also carries a strong, hairpin-type spring 28 the limbs 29 of which are engaged by the lower edges of the pawls 26,27 respectively. The spring 28 urges toe lower edges of the pawls 26,27 outwardly, and the pawls 26, 27 are interconnected by a light spring 31 which urges the pawls 26,27 to pivot in a direction to maintain their lower edges in contact with the limbs 29 of the spring 28.

The switch is cancelled in use from either of its operative positions back to its inoperative position by the action of one of a pair of strikers rotatable with the steering column of the vehicle in a plane above the plane of the rotor 13. When the rotor 13 is in its inoperative position the pivot piece 19 is in such a position that the uppermost tips of the pawls 26,27 lie in a plane parallel to, but slightly below the plane of rotation of the strikers. However, when the rotor 13 is moved to either of its operative positions, the pivot piece 19 is moved to a position wherein either the pawl 26 or the pawl 27 lies in the path of movement of the strikers. With the steering in the straight ahead position, the strikers are positioned on either side of, and above the pawls 26,27.

The operation of the switch is as follows. When the switch is in its inoperative position, neither of the pawls 26, 27 is in the path of movement of the strikers, and so operation of the steering of the vehicle has no effect upon the switch. Movement of the rotor 13 to its first operative position completes the circuits to the direction indicator lamps on one side of the vehicle, and through the intermediary of the finger 21 and one of the walls 22, moves the pivot piece 19 to a position wherein the pawl 26 lies in the path of movement of the strikers. Thus, a forthcoming turn is indicated to other vehicles by the operation of the indicator lamps. As the turn is negotiated, the steering wheel of the vehicle is rotated, and one of the strikers engages the outer surface of the pawl and causes the pawl to be pivoted relative to its respective limb 24 against the action of the spring 31, thereafter the strikers move away from the pawl 26 during the first 180° of movement of the steering wheel, and then towards the pawl 26 for the following 180° of the movement of the steering wheel. When the steering wheel has been rotated through a little less than 360°, the other of the strikers engages the outmost surface of the pawl 26, and should the wheel be rotated further in the same direction, the striker will, as described above, cause the pawl 26 to be pivoted relative to its respective limb 24 to move the bottom edge of the pawl 26 away from the limb 29 of the spring 28, against the action of the spring 31. Thus the strikers can ride past the pawl 26 without affecting the position of the switch. However, during the return movement of the steering wheel when the turn has been negotiated, one of the strikers will engage the pawl 26 and bear against the pawl 26. The spring 28 is a relatively strong spring, and the force generated by the detent means retaining the rotor 13 in its operative position is less than the force required to flex the spring 28. Thus further movement of the steering wheel in the return direction causes said one striker to bear against the pawl 26, with sufficient force to push the pawl 26 in the direction of movement of the striker, without flexing the spring 28. Thus, the pivot piece 19 is caused to pivot, and in so doing returns the rotor 13 to its inoperative position. When the rotor 13 reaches its inoperative position, the pawl 26 has been moved downwardly out of the striker, and the striker then has no further action on the switch as the steering wheel is rotated to its straight ahead condition.

The sequence of operations involved in performing, and indicating a turn in the opposite direction, is similar to that described above, with the exception that the pawl 27 is the operative pawl.

In the event, that when the striker engages the pawl 26, or 27, when steering wheel is being returned to its straight ahead position, and the lever 14 is held to maintain the rotor in its operative position, then the respective limb 29 of the spring 28 is flexed by the action of the striker on the respective pawl 26 or 27 to permit the pawl 26 or 27 to pivot relative to its respective limb 24 so that the striker can pass the respective pawl without any damage occuring to the switch.

The pawls 26,27 are inclined at an angle to the plane of the plate 23, in such a manner that the faces of the pawls are tangential to the path of movement of the strikers. Thus during cancelling the striker engages an edge of the respective pawl which is presented at right angles to the direction of movement of the striker.

Having thus described my invention what I claim as new and desire to secure by Letters Patent is:

1. A direction indicator switch for a road vehicle, including a body adapted to be secured to the stationary outer part of the steering column of a road vehicle, a manually movable rotor pivotally mounted on the body for movement relative to the body about an axis parallel to the axis of the steering column between a pair of operative positions on opposite sides of a central off position, contact means operable in the operative positions of the rotor to energize indicator lamps on opposite sides of the vehicle respectively, a cancelling pawl assembly operable by a striker rotatable with the steering wheel of the vehicle in a plane parallel to but spaced from the plane of rotation of the rotor, the cancelling pawl assembly being pivotally mounted on the body for movement relative to the body about an axis at right angles to the axis about which the rotor is movable, between a pair of operative positions on opposite sides of a central inoperative position, and means for interconnecting the cancelling pawl assembly and the rotor so that movement of the rotor to an operative position moves said assembly to an operative position and return movement of said assembly to its inoperative position returns said rotor to its off position.